Figure 1:
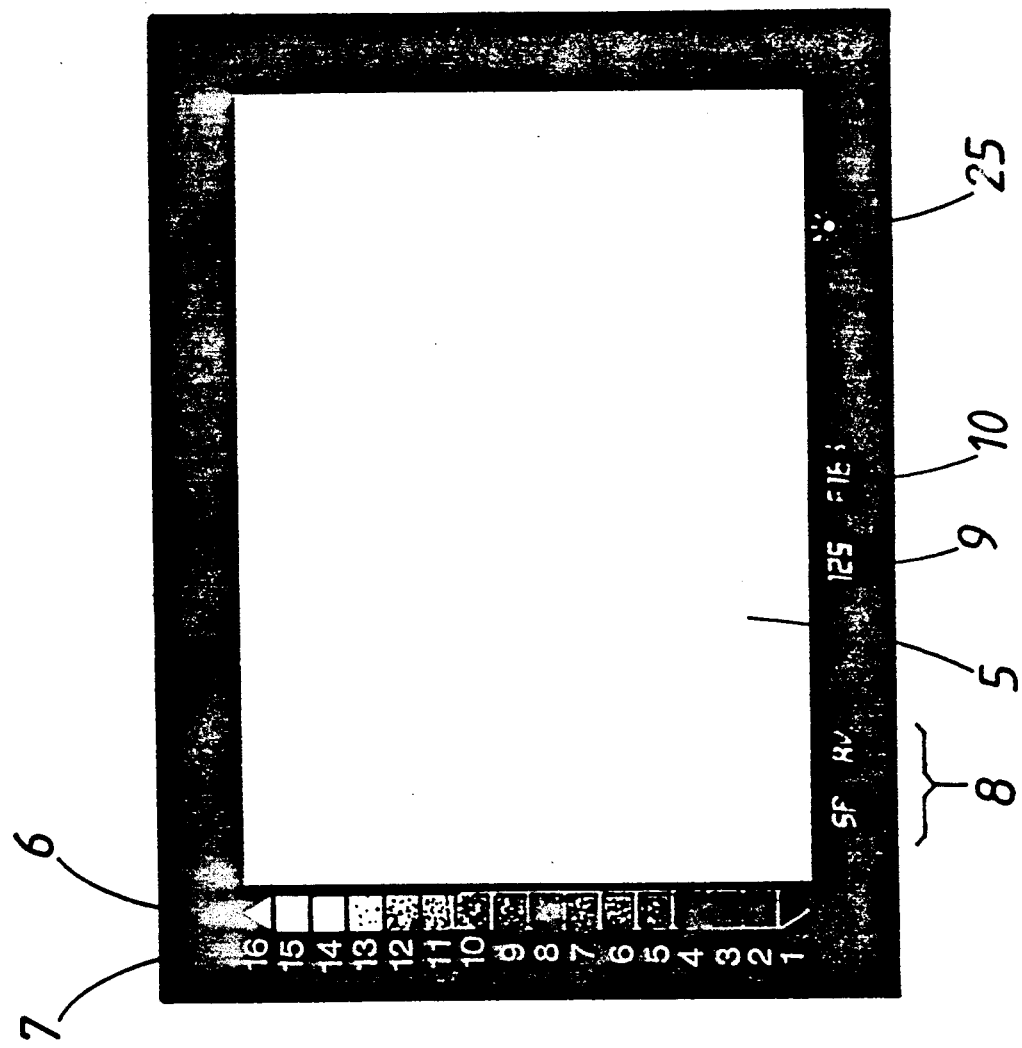

United States Patent [19]

Molloy

[11] Patent Number: 5,014,081
[45] Date of Patent: May 7, 1991

[54] METERING SYSTEM

[76] Inventor: Peter J. P. Molloy, 3 Brown Street, Ponsonby, Acukland, New Zealand

[21] Appl. No.: 243,760

[22] Filed: Sep. 13, 1988

[30] Foreign Application Priority Data

Sep. 14, 1987 [NZ] New Zealand .................. 221793

[51] Int. Cl.⁵ .................. G03B 15/05; G03B 17/20
[52] U.S. Cl. .................. 354/416; 354/474; 354/219
[58] Field of Search .......... 354/465, 471, 472, 474, 354/475, 289.12, 289.1, 219, 224, 225, 155, 105, 106, 109, 410, 202, 416, 417, 413, 410, 432, 202 FF; 356/227

[56] References Cited

U.S. PATENT DOCUMENTS 4,449,822 5/1984 Yuasa et al. .................. 354/474 X
4,751,542 6/1988 Modero .................. 354/410

Primary Examiner—W. D. Perkey
Attorney, Agent, or Firm—Panitch Schwarze Jacobs & Nadel

[57] ABSTRACT

A method and apparatus for reproducing subject tone in a photograph in a manner predetermined by the photographer comprises assessing the tonality of the subject with reference to a tonal scale by simultaneously viewing both the subject and the tonal scale through a viewfinder of a camera or a reflected light meter. The exposure parameters of the camera are then adjusted to insure accurate reproduction of the tonality of the subject, as assessed by the photographer with the aid of the tonal scale.

17 Claims, 2 Drawing Sheets

METERING SYSTEM

This invention relates to a metering system and more particularly to a metering system for use with or incorporation into camera equipment which allows a photographer to ensure the tonality of the subject is reproduced in the final photographic result in a manner predetermined by the photographer.

Commonly available light metering systems for cameras assume an average reflectivity of 18% grey for a subject. Accordingly if a darker or brighter subject is photographed over- or under-exposure of the negative or transparency will result. Many available systems allow the compensation to be made for darker or brighter tones, however this generally involves the photographer taking his or her eye away from the viewfinder, and setting an exposure compensation dial or control somewhere on the camera. These are generally calibrated in one-third stop increments over a range of three stops on either side of normal and are marked + and −. However they are not marked in a manner which indicates, with any accuracy, the results likely to be achieved by their use.

Such arrangements obviously have disadvantages associated with them. Firstly there is the disadvantage arising from the need for the photographer to take his or her eye away from the viewfinder. Secondly there is the possibility of setting the dial or control incorrectly. For example instead of setting +2 stops compensation for an almost white tone, setting −2 stops. This would cause a 4 stop under-exposure. Another problem with standard metering systems is that suitable indication means are often not provided in the viewfinder to remind the photographer to reset the exposure compensation control to normal when this is appropriate. This will cause incorrect exposures to be made when the next average toned subject is photographed. As a result, exposure compensation dials are typically not used.

It is therefore an object of the invention to provide an alternative method of and/or apparatus which will allow the tonality of the subject to be reproduced, in a manner easily predetermined by the photographer, in the final photographic result or which will at least provide the public with a useful choice.

Accordingly, in one aspect, the invention consists in a method of reproducing subject tone in a photograph in a manner as predetermined by the photographer said method comprising the steps of assessing the tonality of a subject with reference to a tonal scale; and adjusting the exposure parameters of a camera to ensure accurate reproduction of the tonality of the subject as assessed by the photographer with the aid of the tonal scale.

The method preferably involves assessment of the tonality of the subject while viewing the tonal scale simultaneously through the viewfinder of a camera or the like.

In most instances the photographer will wish to reproduce exactly the tonality of the subject in the photographic result and accordingly by simultaneously viewing both the scale and the subject the tonality of the subject or, with the aid of spot metering, part of the subject, can be assessed in terms of one of the tones on the scale.

The method according to the invention may also involve the operative use of a tonal scale included within a modified form of conventional hand held light meter of a form to be described hereinafter.

Typically, as stated above, the photographer will wish to accurately reproduce the tonality of the subject. In some instances, however the photographer may wish to intentionally "distort" the tonality of the subject. The present invention allows this to be achieved in a measured way.

In a further aspect the invention consists in apparatus to facilitate the reproduction of subject tonality in a photograph as predetermined by the photographer said apparatus including a tonal scale; and processing means operatively connected to indicating means corresponding to or associated with at least some of the elements on said scale, said processing means further including sufficient data concerning the exposure parameters of a camera to indicate which permutations of exposure parameters are required to accurately reproduce the tonality as assessed and indicated by indicia corresponding to the elements of the tonal scale these indicia being operatively connected to said processing means.

The tonal scale and processing means are preferably included within a camera body. The tonal scale is preferably located within the camera viewfinder such that the tonality of the subject or part of that subject can be assessed in terms of one of the elements of the tonal scale.

The processing means is preferably operatively connected to a photo cell or cells to measure the amount of light reflected by the subject, the I.S.O. input, the shutter speed and aperture controls as well as to indicia corresponding to each of the elements on the tonal scale. Accordingly manipulation of aperture and/or shutter speed settings, and on rare occasions I.S.O. settings, will give an indication on the tonal scale as to how the tonality of the subject, or part of the subject, will be reproduced photographically.

It is not essential that apparatus according to the invention be embodied within a camera. The invention could also be embodied in a modified form of the conventional hand held light meter. In the case of such an embodiment the tonal scale would be included on or within some visible part of the meter and again would have indicia corresponding to each element of the scale operatively connected to the processing element within the meter. Also included in such a meter would be input controls so that the photographer could readily determine what changes would need to be effected to the recommended exposure settings in order to achieve each tone on the tonal scale in the photographic result.

In yet a further aspect the invention may broadly be said to consist in a camera including the apparatus hereinbefore set forth.

To those skilled in the art to which the invention relates, many changes in construction and widely differing embodiments and applications of the invention will suggest themselves without departing from the scope of the invention as defined in the appended claims. The disclosures and the descriptions herein are purely illustrative and are not intended to be in any sense limiting.

Figure 2:
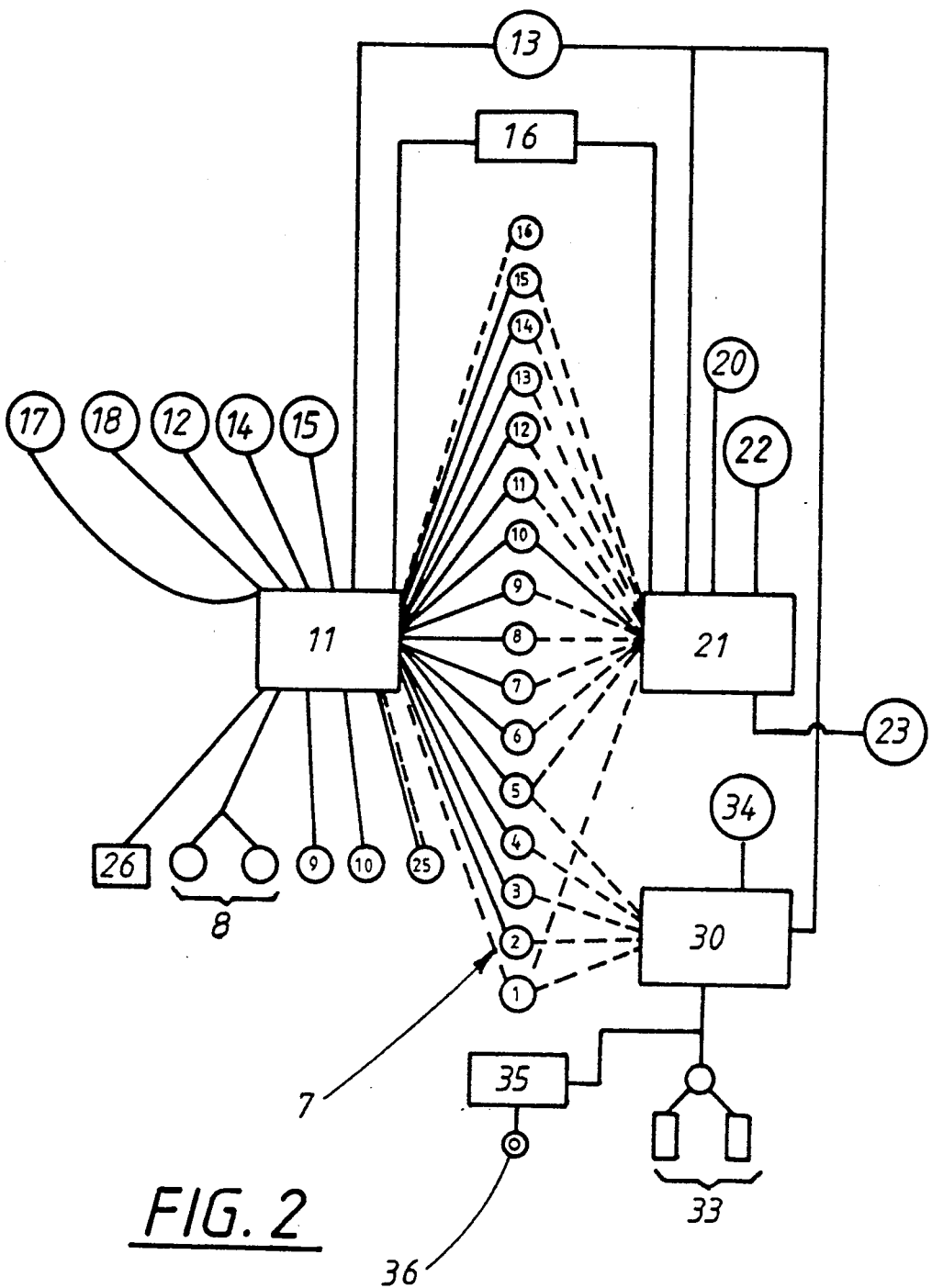

One form of the invention will now be described with reference to the accompanying drawings in which:

FIG. 1 shows a schematic view through the viewfinder of a camera including apparatus according to the invention; and FIG. 2 shows a schematic outline of the components incorporated in apparatus according to the invention.

The present invention provides a method of and/or apparatus for facilitating the accurate reproduction of subject tonality in a photograph thus avoiding the under-exposure or over-exposure which commonly occurs and the associated loss of detail and quality. This under- or over-exposure arises because the camera or light meter (as the case may be) assumes that all subjects have an average reflectivity or tonality of 18% (grey).

The present invention seeks to overcome this by providing a tonal scale in the camera or lightmeter as a visual reminder of this assumption and in relation to which the photographer can assess the tonality of the subject he wishes to photograph. In the case of the apparatus according to the invention suitable light measuring, processing and indication means are also provided to indicate to the photographer the manner in which the exposure parameters of the camera will need to be set if the desired tonality is to be reproduced.

In this context "exposure parameters" mean those parameters which affect the exposure of the negative or transparency as the case may be. Typically these parameters are shutter speed, aperture setting and the I.S.O. rating of the film.

The metering system according to the invention is preferably embodied within a camera. Referring to FIG. 1 the viewfinder 5 of a camera embodying the invention is shown. Included within the viewfinder is a tonal scale 6 which preferably includes a range of 16 tones ranging from maximum black (tone 1), through the standard grey of 18% reflectance (tone 10), up to maximum white (tone 16) in increments of half stops or steps as they are more recently known. In the embodiment of the invention depicted, a series 7 of light emitting diodes (L.E.D.'s) or other indicia are provided, which may be in the form of and/or illuminate numbers corresponding to each element on the tonal scale. It should be appreciated that the tones in the accompanying drawings are not truly representative due to the reproduction process.

As indicated in FIG. 1 the viewfinder may also include features which are common to prior art cameras such as an indicator 8 of whether the exposure parameters are being determined by a spot metering method or by an average metering method, shutter speed indicator 9 and aperture setting indicator 10. These features would be well known to the person skilled in the art.

Referring to FIG. 2 the L.E.D.'s which illuminate the numbers in series 7 adjacent to each tone on the tonal scale are operatively connected to micro-processor 11 or the like located within the camera body (not shown) and powered by a power source (not shown) also located in the camera body. Also fed into the microprocessor 11 in a manner well known to those skilled in the art are signals from a photo cell or cells 12 which represent details of the amount of light being reflected by the various parts of a subject or (in the case of spot metering) reflected by a particular part of the subject, the I.S.O. rating of the film at 13, shutter speed at 14 and aperture setting at 15.

As shown in FIG. 2 the various indicators located in the camera viewfinder 5 are activated by the microprocessor 11 including each of the indicia in the series 7. In the case of indicia 2 to 15 inclusive, the programming of processor 11 is such that when, based on all the input signals, it assesses the presence of one of these tones it causes the indicium corresponding to that tone to glow steadily. However the micro-processor 11 is preferably programmed to cause indicia 1 and 16 to rapidly flash on and off in the event the processor determines that gross under- or over-exposure respectively will occur based on the signals being received by it.

Also fed into the processor 11 is a signal from switch 16 to set the apparatus in spot or average metering mode; a signal from switch 17 which sets various "modes" of operation in a manner to be described hereinafter; and an exposure compensation switch 18 which, for cameras capable of automatically establishing shutter speed and aperture settings, enables manual manipulation of the automatically established settings in order to reproduce "non-average" subject tone.

In manual mode a metering system according to the present invention is used in the following manner: The correct I.S.O. rating of the film in use is set and the metering system is activated. The photographer then assesses the tonality of the subject (or part of the subject if spot metering is selected) and adjusts the aperture and/or shutter speed settings until the L.E.D. corresponding to the appropriate tone on the scale glows or is illuminated.

For example if the subject is to be authentically reproduced and is assesssed to be a pure white tone the photographer adjusts the aperture and/or the shutter speed until the L.E.D. next to tone 15 glows.

If on the other hand the photographer wished to reproduce the subject as a darker tone, adjustment of the exposure parameters would be made so that one of the L.E.D.'s next to a darker tone was illuminated.

In the case of cameras which can operate in an "automatic" mode i.e. automatically determine shutter speed or aperture setting or both, the processor will also receive and process data representing the position of an exposure compensation switch 18. In any of these automatic modes the processor 12 interprets the various input data and provides an electronic signal to the diode adjacent to the average 18% grey tone on the scale unless the exposure compensation switch 18 is moved to another setting in which case the processor is programmed to cause the appropriate L.E.D. to flash slowly on and off to remind the photographer to reset the switch 18 to the normal setting when appropriate.

Thus a metering system according to the present invention allows for predetermined tonally accurate photographic exposures to be made regardless of the tonality of the subject.

In this regard it should be appreciated that with previously available metering systems if the same lighting conditions are maintained but the tonality of the subject changes from an average grey tone to a lighter tone, previously available light metering systems would interpret the increase of reflected light as a increase in light conditions and would indicate (in a manual mode) that the amount of light reaching the film should be reduced by altering the aperture and/or shutter speed settings or (in an automatic mode) would automatically effect those alterations which would result in under-exposure.

In mannual mode a metering system according to the present invention would avoid any such problems upon change of subject tonality to a lighter tone as the programming of the processor 11 would cause another L.E.D. further up the scale next to a lighter tone to glow confirming that the exposure settings were still correct.

In an automatic mode the presence of the tonal scale in the viewfinder provides a visual reminder upon photographing a lighter or darker than average subject to set the exposure compensation control to cause the L.E.D. next to an appropriate tone on the scale to flash slowly on and off.

On the other hand if the lighting conditions alter but the subject tone remains the same, in manual mode an L.E.D. further up or down the scale, next to a lighter or darker tone glows indicating an adjustment of the exposure settings is necessary. In automatic mode the alteration is achieved automatically.

The tonal scale according to the present invention may also be used in conjunction with through-the-lens flash metering which is provided with many currently available cameras. Because this type of flash metering system makes the same assumptions about the subject tonality as many available light metering systems under-exposure of light subjects and over-exposure of dark subjects typically occurs.

Through-the-lens flash metering uses a separate flash sensitive cell or cells 20 located inside the mirror box (not shown) or a camera which cell or cells points at the film itself and measure the amount of light reflected by the film during the exposure. When the cell 20 (FIG. 2) has sensed enough light has been emitted to accurately expose a subject of average 18% grey reflectivity a signal is sent to the flash unit which abruptly halts the flash emission, thus leading to exposure errors unless the subject itself is of average 18% grey reflectivity.

So as to avoid such exposure errors a camera embodying the invention preferably further includes a flash exposure compensation control displaceable in half-stop increments (or 1 tone increments) in a suitable position on the camera which allows the photographer to quickly make adjustments for lighter or darker than average subjects without taking his or her eye from the viewfinder.

Referring to FIG. 2 the cell 20 is operatively connected to flash exposure compensation processor 21 which is also located within the camera body (not shown) and may conveniently be powered from the same source as processor 11. The processor 21 also receives data indicating the I.S.O. rating of the film in use (at 13) and data representing the position of flash compensation dial 22 which is, in use, manually adjusted to effect selection of one of tones 5 to 15. An output signal is provided at 23 to halt the flash emission when, based on information stored in memory, the processor 21 determines that the emission is sufficient to achieve the selected exposure. In a manner which will be readily apparent to one skilled in the art the processor 21 is programmed to effect compensation by adjusting the sensitivity of the flash metering cell 20 (or cells if spot metering is available) or by altering the effective value of the I.S.O. index.

When set to "Normal" in through-the-lens flash metering mode, the processor 21 causes the L.E.D. next to the average 18% grey tone 10 to glow steadily.

If the flash exposure compensation control is moved from the normal position to another setting, the processor 21 is programmed to cause the L.E.D. next to the selected tone to flash slowly on and off as indicated by the dotted lines to remind the operator to reset the control when appropriate.

A further feature of such an arrangement is the provision of a warning signal, visible through the viewfinder of the camera which as indicated, is preferably, the L.E.D. next to tone 1 flashing rapidly on and off. The processor is preferably programmed to provide such a warning signal for a few seconds after a flash exposure in the event that the signal from the flash sensor is not sent to the flash indicating under exposure. Thus an operator is warned to open the aperture by one or more stops, in order to allow more light to reach the film during the next exposure.

With previously available systems, when using through-the-lens controlled flash to "fill-in" shadows on a subject which is lit from behind by, for example, the sun, the amount of light provided by the flash of a camera is out of the operators control unless the camera's exposure compensation dial is used or the I.S.O. rating of the film is altered to vary from the rating of the film actually being used. This would also affect the available light metering and is time consuming.

With a metering system according to the present invention, however, a greater degree of control when combining the two sources of illumination is available. This is as well as providing accurate exposure control with available light and with through-the-lens controlled flash light. With the separate through-the-lens flash compensation control according to the present invention, the degree of "fill-in" flash is easily varied without the operator removing his or her eye from the viewfinder.

In the preferred form of the invention there are four different modes, selected through control 17, available as follows:
(i) Available
(ii) Flash
(iii) Available and Flash
(iv) Off Mode (i) allows for the metering systems to be activated for a predetermined time when the shutter button is slightly depressed. Processor 11 is programmed to cause an L.E.D. next to one of the tones on the tonal scale to light up to indicate the tonality which would be recorded on to the film at the selected exposure settings. If the exposure settings are likely to cause gross under- or over-exposure the processor 11 ensures that the L.E.D. next to the tone 1 or tone 16 flashes rapidly on and off as indicated by the dotted lines in FIG. 2.

The second mode (ii) for through-the-lens flash control activates the cell or cells 20 facing the film and the processor 21 and causes the L.E.D. next to the average tone 10 to glow steadily. In the event that the flash compensation control is moved from its normal setting, the L.E.D. or number next to the selected tone flashes slowly on and off.

The third mode (iii) for available and flash light allows for operation as for the modes (i) and (ii). In the event that the same tone is selected for available and flash light, the L.E.D. next to the tone in question flashes slowly on and off.

The fourth mode (iv) is adapted for use when the camera is being used without a through-the-lens controlled flash unit. This mode prevents any irrelevant or irritating information being shown in the viewfinder, when for example working in a studio with studio flash lighting or with a hand held meter. Only the shutter speed and aperture selected are shown for a predetermined time after the shutter release has been slightly depressed.

The metering mode may still further include a signalling means operatively connected to the processor 11 which is adapted in use to confirm correct tonal assessment in direct sunlight or to warn an operator of likely under-exposure in direct sunlight (or lower lighting conditions) at the selected shutter speed and aperture according to the "F16 RULE". This signal operates in modes (i) and (iii) only. This signal is preferably a feature provided in the viewfinder of a camera which may be, for example, a symbol of the sun and is indicated at 25 in FIGS. 1 and 2.

If the aperture and shutter speed combination selected is likely to cause more than one quarter of a stop under-exposure of a sunlit subject according to the "F16 RULE" the processor 11 is programmed to cause the sun symbol 25 to flash slowly on and off to warn the operator to reassess the tonality of the subject being metered.

If the shutter speed and aperture selected are likely to give a good exposure (that is, for example, within one quarter of a stop under or over) of a subject lit by direct sunlight, according to the "F16 RULE", the processor 11 will cause the sun symbol 25 to glow steadily.

In this context the "F16 RULE" states that with a subject lit by direct sunlight, with the aperture of the lens set to F16 and the reciprocal of the I.S.O. index of the film used as the shutter speed, the subject will be well exposed on the film. For example, if the I.S.O. index of the film is 125 and with the aperature set to F16 the sunlit subject will be well exposed if the shutter speed was 1/125th of a second.

Because shutter speeds and apertures are related, a number aperture and shutter speed permutations would achieve the same exposure. For example, the following combinations would all achieve good exposures of a directly sunlit subject with 125 I.S.O. film 1/15th, at F 45
1/30th, at F 32
1/60th, at F22
1/125th, at F16
1/250th, at F11
1/500th, at F8
1/1000th, at F 5.6

Thus by selecting a shutter speed and aperture combination which causes the sum symbol 25 to glow steadily, an opertor can accurately assess, with the use of spot metering, the tonal values of various subjects lit by direct sunlight thereby preparing him or herself for correct tonal assessment in other lighting conditions.

As a further preferred feature the processor 11 of a camera embodying the invention may be operatively connected to a printing facility 26 in a manner such that the tone number and metering pattern selected by the operator may be printed next to the frame on a film at the time of exposure. This allows for explanations for over-or under-exposed results. For example, if an operator had selected spot metering and tone 10 when photographing a subject in white clothing against a white background, the data printed onto the film next to the exposure would show this information and would explain the under-exposed result. This would allow the operator to correct the tonal assessment the next time a similar tone was being metered.

Operation of apparatus according to the invention can also be used to effect a type of "Tonal Compression" on individual frames of film. This is particularly the case with an operator who has relatively advanced understanding of metering systems, exposure and the limited recording range of photographic film as encouraged by this invention.

"Tonal Compression" is a means whereby the recording range of the film is extended to record a "wider tonal scale". It is usually applied when the lighting is undesirably contrasting and there are important shadow details in the subject.

"Tonal Compression" can be achieved by over-exposing the film slightly and under-developing slightly which can cause the disadvantage of reducing the tonality of the light tones in the subject. This method is not commonly used with roll film cameras as it affects all the exposures on the roll.

Because of the human eye's "automatic aperture" or iris it is difficult to visually judge how lighting contrast will affect the result. A further benefit of the tonal scale is that it can be used with spot metering to indicate directly in terms of tonality how various parts of the subject, including shadow details, will be recorded onto the film.

Using the tonal scale on a metering system according to the present invention a type of selective tonal compression can be achieved with individual exposures and to vaying degrees by activating a multi-exposure switch (not shown) on a camera and making an ordinary exposure of the subject. Thereafter, with the camera pointing at a clean evenly lit card an aperture is selected which causes one of the L.E.D's between tone 1 and tone 5 to glow. Another exposure is then added to the already exposed frame of the film. Varying the exposure of the card from tone 1 to tone 5 controls the degree of tonal compression. This provides for an increase of the tonal value of the lower tones in a subject, to varying degrees, with the effect being most noticeable on tones lower on the scale. As there is little effect on tone 10, or tones above tone 10, there is not exposure adjustment needed unless transparency film is used. If transparency film is used there should be a reduction of approximately one third of a stop if tone 5 is added. This is by way of example only.

This "selective tonal compression" could also be achieved in an alternative manner without the disadvantages of conventional methods.

Referring again to FIG. 2 a camera embodying the invention may be further provided with a tonal compression processor 30 which for reasons stated above is operatively connected to each of the indicia corresponding to tones 1 to 5. The processor may be powered from the same source as processors 11 and 21 and, as with the other processors, receives a signal from 13 indicating the I.S.O. rating of the film is use. An output signal from processor 30 leads to a variable charge capacitor 31 which in turn operates one or more relatively small flash tubes or other light sources 33 located in the mirror box (not shown) beside the rear element of the lens (not shown) and facing the film (not shown). The processor 30 also receives a signal indicating which of tones 1 to 5 is to be superimposed during exposure, this signal being adjusted manually by operating of control 34. The processor 30 is programmed so as to process signals from sources 13 and 34 and then vary the degree of charge stored in capacitor 31 so that upon operation of shutter 35 by shutter release 36 the flash tube or tubes 33 will operate for a period of time sufficient to alter the exposure produced upon opening of the shutter, by the predetermined amount.

Thus the processor 30 allows for the film frame in position to be provided with, at the same time as the ordinary exposure of the subject, a very even exposure, in varying amounts, which is equivalent to the exposure received by the film with the method as described above. That is the amount of exposure received from an evenly lit card with the L.E.D. corresponding to tones 1, 2, 3, 4 or 5 glowing.

As shown in the control 34 has six settings as follows: OFF, tone 1, tone 2, tone 3, tone 4 and tone 5. Any of these settings may be selected, as appropriate, and as indicated in FIG. 2 the processor 30 is programmed to cause the L.E.D. corresponding to the particular tone selected for superimposing to flash slowly on and off. Upon release of the shutter 35, depending on which tone is selected, the flash tubes or other light sources 33 operate thus subjecting the film to a degree of extra exposure.

The tonal compression control 34 may be arranged in such a manner as to allow an operator to select a tone and lock it on that setting for a series of exposures. If the tone is not locked in or the control 34 returned to the "OFF" setting the processor 30 is programmed to automatically select the next tone down the scale until the "OFF" setting has been selected. The advantage of this arrangement is that an operator is able to take up six exposures of varying contrasts without taking his or her eye from the viewfinder.

Thus, by this invention there is provided a metering system which allows for increased accuracy in exposure and contrast readings and allows for a degree of control of contrast in photographic results.

What I claim is:

1. A method of reproducing subject tone in a photograph in a manner as predetermined by the photographer using a camera with a through-the-lens flash apparatus or a light meter therefor, said method comprising the steps of:
   (i) assessing the tonality of a subject with reference to a tonal scale by simultaneously viewing both the subject and the tonal scale through a viewfinder of a camera or light meter; and
   (ii) adjusting the exposure parameters of the camera or light meter and/or varying the flash emission time of the flash apparatus to ensure accurate reproduction of the tonality of the subject as assessed by the photographer with the aid of the tonal scale.

2. A method as claimed in claim 1 wherein the tone on the tonal scale which corresponds as nearly as is possible to the tone of the subject is selected and the exposure parameters of the camera adjusted to reproduce the selected tone.

3. A method as claimed in claim 1 wherein the degree of variation of flash emission is determined by metering light reflected from the photographic film.

4. A method as claimed in claim 1 wherein the flash duration is varied by selecting an appropriate setting on a separate flash exposure compensation dial or control on a camera while viewing the subject and tonal scale simultaneously through the viewfinder of a camera and observing the variation in expected tone from said tonal scale.

5. A method as claimed in claim 1 including the further step of causing a number corresponding to the tone arising from the selected exposure parameter to be recorded onto the film.

6. A camera or light meter able to reproduce subject tonality in a photograph as predetermined by the photographer, said camera or light meter comprising:
   (a) a tonal scale visible through a viewfinder of the camera or light meter;
   (b) a through-the-lens flash apparatus;
   (c) processing means operatively connected to indicating means corresponding to or associated with at least some of the elements on said tonal scale, said processing means further including sufficient data concerning the exposure parameters which are required to accurately reproduce the tonality as assessed and indicated by indicia corresponding to the elements of the tonal scale, these indicia being operatively connected to said processing means; and
   (d) flash exposure compensation means operable to alter the flash emission of the flash apparatus so as to accurately reproducing the subject tone.

7. The camera or light meter as claimed in claim 6 wherein said inidcation means comprises indicia for each tone on said tonal scale.

8. The camera or light meter as claimed in claim 7 wherein said indicia comprise light-emitting diodes.

9. The camera or light meter as claimed in claim 6 including sensing means to meter light reflected from a photographic film during flash emission; and a flash exposure compensation processor operable to receive and process signals from said sensing means and halt the flash emission when the degree of exposure necessary to achieve reproduction of the pre-determined subject tone has occurred.

10. A camera or light meter as claimed in claim 6 wherein said indicia include or comprise numbers.

11. A camera as claimed in claim 10 further including a printing facility operable to record onto the film the number of the tone and the metering pattern selected by the photographer at the time of exposure.

12. A camera or light meter as claimed in claim 6 including a further symbol operatively connected to said processing means and operable to provide an indication when the exposure parameters are appropriate to authentically photograph directly sunlit subject and further operable to provide a warning if the exposure parameters are in a combination to cause underexposure of directly sunlit subjects.

13. A camera as claim in claim 6 further including a "selective tonal compression" control operatively connected to a tonal compression processor, said tonal compression processor being operable to control the amount of extra exposure provided by one or more light sources within a mirror box of the camera and facing the film.

14. A camera as claimed in claim 13 wherein the "selective tonal compression" processor is further operable to provide an indication on the tonal scale of which tone has been selected on the "selective tonal compression" control.

15. A camera as claimed as claim 13 or claim 25 wherein said tonal compression processor is further operable to lock the selected degree of tonal compression for a series of exposures, or alternatively, is operable to reduce the effect of tonal compression in small increments with each consecutive exposure until an "off" setting is selected.

16. A method of visually assessing the tonality of a photographic subject, said method comprising the steps of setting the exposure parameters of a camera or a hand-held light meter until there is an indication that the parameters are appropriate for directly sunlit subject; selecting spot metering while simultaneously viewing the directly sunlit subject and a tonal scale through the viewfinder of the camera or hand-held light meter; and observing the tonality indicated on the tonal scale which would be recorded on the film at the selected exposure settings.

17. A method of altering the darker tonal values of a photographic subject in a measured and predictable way, said method comprising the steps of viewing the subject and a tonal scale simultaneously through the viewfinder of a camera; selecting an appropriate setting on a "tonal compresson" control and noting the effect of the setting on the tonal value of the subject from the tonal scale.

* * * * *